US012767083B2

(12) United States Patent

Benthall et al.

(10) Patent No.: US 12,767,083 B2

(45) Date of Patent: Oct. 20, 2026

(54) SINGLE LEVEL CYLINDRICAL PASSENGER INFLATOR

(71) Applicant: ARC TECHNOLOGY HOLDING LIMITED, Hong Kong (HK)

(72) Inventors: Samuel Benthall, Friendsville, TN (US); Kristian Winston, Knoxville, TN (US); Scott Lohmann, Knoxville, TN (US); Brian Thomas, Maryville, TN (US); Tyler Laughter, Knoxville, TN (US); Susilpa Bommareddy, Knoxville, TN (US)

(73) Assignee: ARC TECHNOLOGY HOLDING LIMITED, Tsimshatsui (HK)

(*) Notice: Subject to any disclaimer, the term of this patent is extended or adjusted under 35 U.S.C. 154(b) by 0 days.

(21) Appl. No.: 19/040,631

(22) Filed: Jan. 29, 2025

(65) Prior Publication Data

US 2025/0249858 A1 Aug. 7, 2025

Related U.S. Application Data

(60) Provisional application No. 63/549,813, filed on Feb. 5, 2024.

(51) Int. Cl.

*B60R 21/217* (2011.01)

*B60R 21/261* (2011.01)

(Continued)

(52) U.S. Cl.

CPC ........ *B60R 21/2171* (2013.01); *B60R 21/261* (2013.01); *B60R 21/264* (2013.01);

(Continued)

(58) Field of Classification Search

CPC .................. B60R 21/2171; B60R 2021/26011

See application file for complete search history.

(56) References Cited

U.S. PATENT DOCUMENTS

| | | | |
|---|---|---|---|
| 5,360,232 | A | 11/1994 | Lowe et al. |
| 5,551,724 | A | 9/1996 | Armstrong et al. |

(Continued)

FOREIGN PATENT DOCUMENTS

| | | | |
|---|---|---|---|
| CN | 208232994 | U | 12/2018 |
| CN | 219029352 | U | 5/2023 |

(Continued)

OTHER PUBLICATIONS

Extended European Search Report dated Jun. 2, 2025 issued in European Patent Application No. 25155750.0, 7 pp.

(Continued)

*Primary Examiner* — Nicole T Verley

(74) *Attorney, Agent, or Firm* — NIXON & VANDERHYE P.C.

(57) ABSTRACT

An airbag inflator assembly includes a cylindrical housing, an initiator assembly secured in an upstream end of the cylindrical housing, and a generant disposed in the cylindrical housing adjacent the initiator assembly. Internal components define a tortuous path for products of combustion and define a plurality of debris collection areas. A rupture disk assembly is secured over an exit aperture, and a diffuser region downstream of the rupture disk assembly includes an output opening through which the products of combustion are vented into the airbag.

16 Claims, 5 Drawing Sheets

(51) Int. Cl.
*B60R 21/264* (2006.01)
*B60R 21/26* (2011.01)

(52) U.S. Cl.
CPC ............... *B60R 2021/26011* (2013.01); *B60R 2021/2612* (2013.01)

(56) References Cited

U.S. PATENT DOCUMENTS

| | | | | |
|---|---|---|---|---|
| 6,189,927 | B1 | 2/2001 | Mossi et al. | |
| 6,851,374 | B1 * | 2/2005 | Kelley | B60R 21/2644 102/530 |
| 7,134,689 | B2 | 11/2006 | Matsuda | |
| 7,530,598 | B2 | 5/2009 | Fischer et al. | |
| 7,600,783 | B2 | 10/2009 | Numoto et al. | |
| 7,654,565 | B2 | 2/2010 | McCormick et al. | |
| 7,712,778 | B2 | 5/2010 | Smith et al. | |
| 7,770,924 | B2 | 8/2010 | Cox et al. | |
| 8,894,096 | B2 | 11/2014 | Fischer | |
| 9,193,327 | B2 | 11/2015 | Clark | |
| 9,700,825 | B2 | 7/2017 | Greenwood et al. | |
| 11,273,788 | B2 | 3/2022 | Bendle et al. | |
| 2003/0034641 | A1 * | 2/2003 | Zimbrich | B60R 21/272 280/741 |
| 2005/0011393 | A1 * | 1/2005 | Kelly | B60R 21/2644 102/430 |
| 2005/0280252 | A1 | 12/2005 | McCormick | |
| 2007/0029762 | A1 * | 2/2007 | Katsuda | B60R 21/264 280/736 |
| 2007/0257476 | A1 | 11/2007 | Green, Jr. et al. | |
| 2009/0020990 | A1 * | 1/2009 | Townsend | B60R 21/264 248/694 |
| 2009/0102171 | A1 * | 4/2009 | Hordos | F42B 3/04 422/165 |
| 2010/0230942 | A1 * | 9/2010 | Rose | B60R 21/2644 280/736 |
| 2012/0326423 | A1 | 12/2012 | Hoffman | |
| 2019/0322239 | A1 * | 10/2019 | Norman, III | B60R 21/2644 |
| 2019/0337481 | A1 * | 11/2019 | Lin | B60R 21/2644 |
| 2019/0351864 | A1 | 11/2019 | Hillmann et al. | |
| 2022/0126780 | A1 | 4/2022 | Simons et al. | |

FOREIGN PATENT DOCUMENTS

| | | | | | |
|---|---|---|---|---|---|
| DE | 102014111040 | A1 * | 2/2016 | B60R 21/2644 |
| EP | 0978424 | B1 * | 6/2003 | B60R 21/264 |
| EP | 1775180 | A2 * | 4/2007 | B60R 21/272 |
| EP | 1911636 | A1 * | 4/2008 | B60R 21/26 |
| EP | 2167352 | B1 * | 12/2011 | B60R 21/264 |
| EP | 4596333 | A1 * | 8/2025 | B60R 21/26 |
| JP | 2008537918 | A | 10/2008 | |
| JP | 2019214358 | A | 12/2019 | |
| JP | 2020-504002 | A | 2/2020 | |
| JP | 2022171704 | A | 11/2022 | |
| KR | 10-2019-0132277 | A | 11/2019 | |
| WO | WO-2007041005 | A1 * | 4/2007 | B60R 21/272 |
| WO | WO-2018125526 | A1 * | 7/2018 | B60R 21/2644 |

OTHER PUBLICATIONS

Japanese Office Action dated Dec. 3, 2025 issued in Japanese Patent Application No. 2025-016344 and English translation, 10 pp.

Korean Office Action dated May 12, 2026 issued in Korean Patent Application No. 10-2025-0014532 and English trnaslation, 18 pp.

* cited by examiner

SINGLE LEVEL CYLINDRICAL PASSENGER INFLATOR

CROSS-REFERENCES TO RELATED APPLICATIONS

This application claims the benefit of U.S. Provisional Patent Application Ser. No. 63/549,813 filed Feb. 5, 2024, the entire content of which is herein incorporated by reference.

STATEMENT REGARDING FEDERALLY SPONSORED RESEARCH OR DEVELOPMENT (NOT APPLICABLE)

BACKGROUND

The invention relates to an inflator assembly for an airbag or other safety device and, more particularly, to an inflator assembly with a cylindrical housing for passenger applications in vehicles that provides repeatable performance, compliant variation, and meets all industry standards.

Existing airbag inflator assemblies come in various shapes with recent versions in a toroidal shape. Newly designed vehicles, particularly electric vehicles (EVs) have limited space for airbag assemblies, and there is a need for an inflator assembly with a cylindrical housing having a reduced outside diameter.

SUMMARY

The inflator assembly of the described embodiments was developed with the intent to optimize the performance output range while meeting all structural and safety requirements. An objective is to produce a cylindrical inflator assembly for passenger applications in vehicles that provides repeatable performance, compliant variation, and meets all industry standards.

The design achieves performance outputs, assembly weights, and an envelope profile (overall length and outer diameter) that are conducive to applications in EV technology. These optimizations provide a competitive edge over existing passenger designs.

The assembly of the described embodiments uses a tortuous path ignition system to lower particulate levels expelled from the inflator assembly, while meeting its performance targets.

In an exemplary embodiment, an airbag inflator assembly includes a cylindrical housing, an initiator assembly secured in an upstream end of the cylindrical housing, a generant disposed in the cylindrical housing adjacent the initiator assembly, and an internal nozzle through which products of combustion flow. In some embodiments, the internal nozzle engages an inside wall of the cylindrical housing. A debris canister is disposed in the cylindrical housing downstream of the internal nozzle. the internal nozzle is configured to direct the products of combustion into the debris canister. The debris canister includes radial orifices adjacent an upstream end. An outside diameter of the debris canister is spaced from the inside wall of the cylindrical housing thereby defining an annular passageway. A screen canister positioned over the debris canister includes plurality of apertures. A formed end plate secured over the screen canister includes an exit aperture. A rupture disk assembly is secured to the formed end plate over the exit aperture, and a diffuser region downstream of the rupture disk assembly includes an output opening through which the products of combustion are vented into the airbag.

The airbag inflator may additionally include a spring secured between the internal nozzle and the generant. The spring may be a coil spring with a closed top spring.

The airbag inflator may include a plurality of debris collection areas including a downstream end of the debris canister, an upstream end of the debris canister, an interface between the cylindrical housing and the formed end plate, an interface between the screen canister and the debris canister, and a downstream end of the screen canister.

The screen canister may be press fit to an exterior of the debris canister. The apertures in the screen canister may define a staggered or offset hole pattern. The rupture disk assembly may include a rupture disk that is configured to rupture by products of combustion after actuation of the initiator assembly. The diffuser region may include a diffuser screen and output openings for venting the products of combustion into the airbag. The cylindrical housing may have an outside diameter of 35 mm or less.

In another exemplary embodiment, an airbag inflator assembly includes a cylindrical housing, an initiator assembly secured in an upstream end of the cylindrical housing, a generant disposed in the cylindrical housing adjacent the initiator assembly, and internal components that define a tortuous path for products of combustion and define a plurality of debris collection areas. The internal components include an exit aperture. A rupture disk assembly is secured over the exit aperture, and a diffuser region downstream of the rupture disk assembly includes an output opening through which the products of combustion are vented into the airbag.

The tortuous path may include at least four turns between the generant and the exit aperture. In some embodiments, the tortuous path includes six turns between the generant and the exit aperture.

The airbag inflator may additionally include at least two debris collection areas among the internal components. In some embodiments, the airbag inflator may include five debris collection areas among the internal components.

BRIEF DESCRIPTION OF THE DRAWINGS

These and other aspects and advantages will be described in detail with reference to the accompanying drawings, in which.

DETAILED DESCRIPTION

Figure 1:
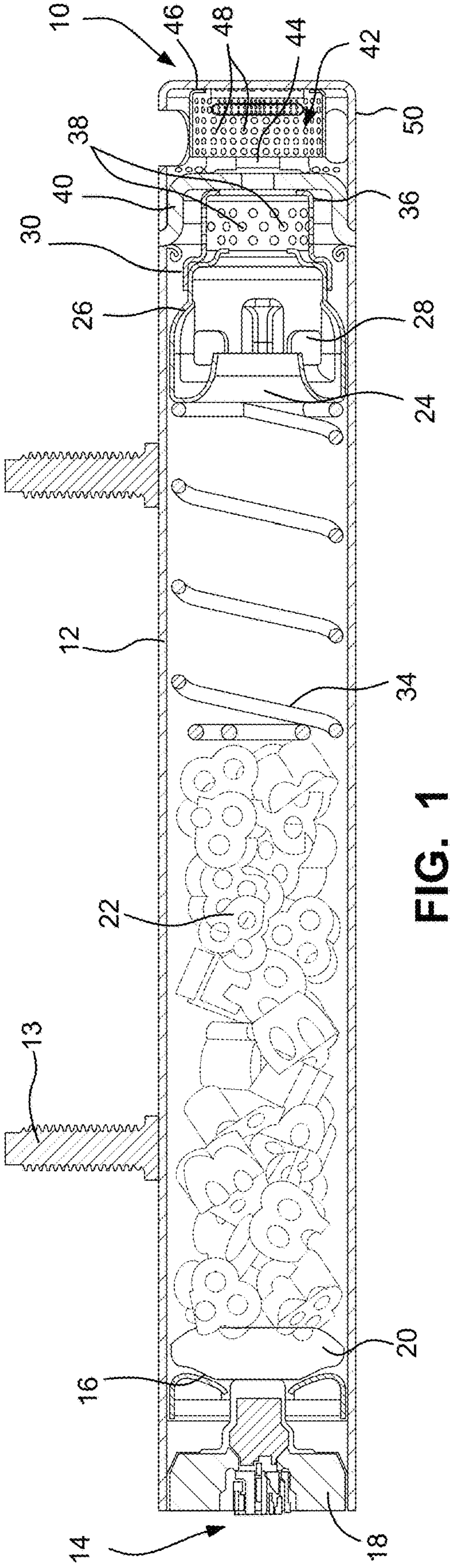
FIGS. 1 and 2 show an exemplary single stage airbag inflator.
Figure 2:
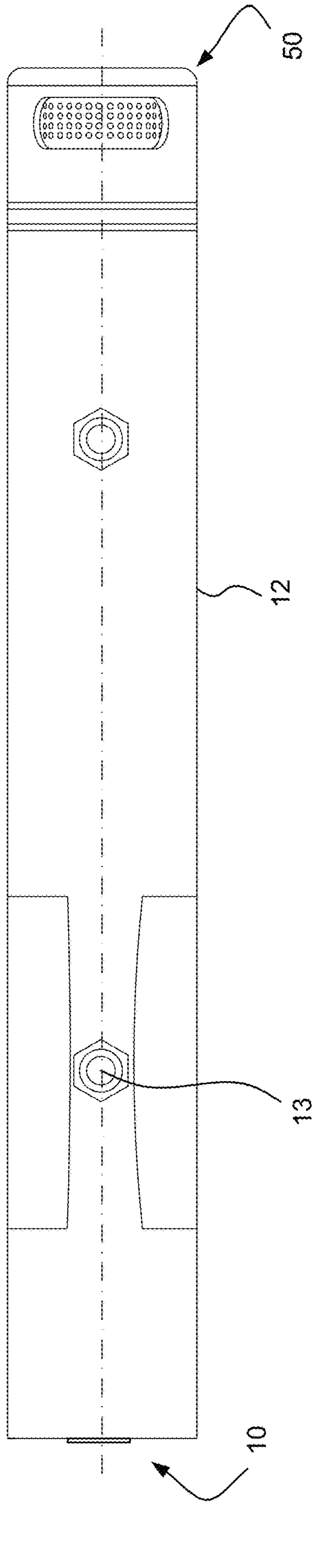

FIGS. 1 and 2 show an exemplary single stage airbag inflator 10 and its internal components. The inflator assembly includes a cylindrical housing 12 and an initiator assembly 14 secured in an upstream end of the cylindrical housing 12. In a preferred construction, an outside diameter of the cylinder housing 12 is 35 mm or less. External attachment features 13 can be applied for module retention.

The initiator assembly 14 includes a cover disk 16 or the like that is press fit into and engages an interior surface of the cylindrical housing 12 and together with an igniter body 18 secures the initiator assembly 14 in place. The structure, function, and operation of the initiator assembly 14 are known, and further details will not be described. Any suitable initiator assembly 14 could be used with the airbag inflator assembly 10 of the described embodiments.

A booster pouch 20 is positioned adjacent the cover disk 16, and a generant material 22 is disposed in the housing 12 adjacent the initiator assembly 14 and the booster pouch 20.

An internal nozzle 24 directs products of combustion into a debris accumulator (DA) canister 26 downstream of the internal nozzle 24. As shown, the nozzle 24 engages the inside wall of the cylindrical housing 12. The internal nozzle 24 may be integral with the DA canister 26. The DA canister 26 includes radial orifices 28 adjacent an upstream end. With continued reference to FIG. 1, an outside diameter of the DA canister 26 is spaced from the inside wall of the cylindrical housing 12, thereby defining an annular passageway 30.

A coil spring 34 may be secured between the internal nozzle 24 and the generant 22 to secure the generant 22 in the propellant chamber. The coil spring 34 may be a closed top spring that additionally serves to provide a surface to block larger particles during deployment.

A screen canister 36 may be positioned over the DA canister 26 and is also spaced from the inside wall of the cylindrical housing 12. The screen canister 36 is secured via an interference fit with the DA canister 26. The screen canister 36 includes a plurality of apertures 38. In some embodiments, the apertures 38 define a staggered or offset hole pattern.

Figure 3:
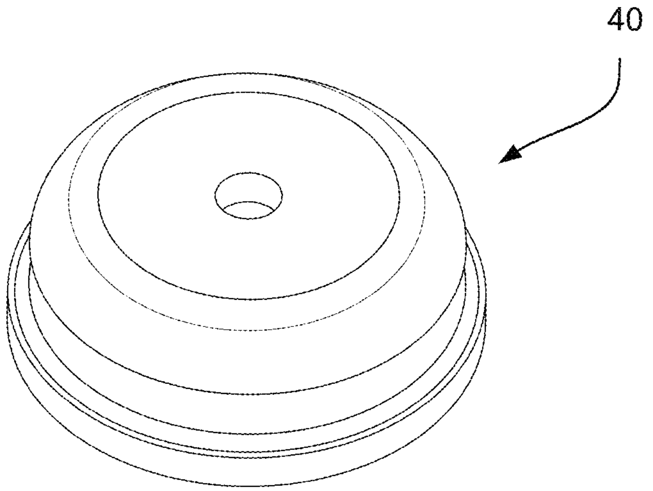
FIG. 3 shows a formed end plate that is secured at an exhaust end of the pressure vessel.

A formed end plate 40 is friction welded to an exhaust end of the pressure vessel/housing 12. A perspective view of the formed end plate 40 is shown in FIG. 3. The formed end plate 40 serves as the interface for the screen canister 36. A rupture disk holder assembly 42 secures a rupture disk 44 over an opening in the formed end plate 40. The rupture disk 44 can be a flat smooth surface part or an alternate design that has a cruciform/hatch feature on the surface. For example, the rupture disk may be in the form of a cruciform disk that will allow this part to "petal" open. The design decreases the opportunity for fragments of the disk to be expelled into the airbag. The rupture disk holder assembly may be modified to accept the larger diameter of the revised rupture disk.

The formed end plate 40 thus also provides a mounting surface for the rupture disk holder assembly 42.

The formed end plate 40 and screen canister 36 provide a "hard stop" for the internal components to stack against. In respect of ball fill operation, the outside surface provides a robust surface for the gas filling operation, which utilizes welding of the disk holder assembly. The disk holder/rupture disk weld provides a surface for welding a single rupture disk assembly that serves as the exhaust port for the performance output.

Figure 4:
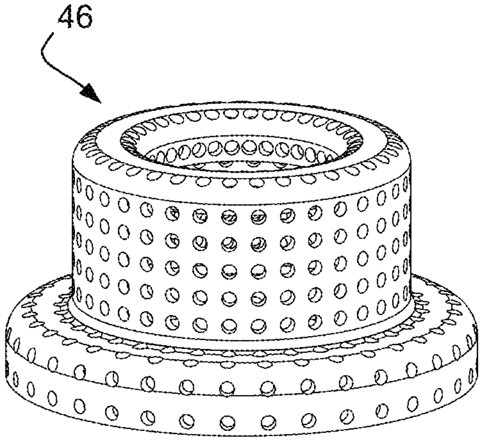
FIG. 4 shows an exemplary screen canister.

A diffuser screen 46 including a plurality of screen apertures 48 is secured over the formed end plate 40 and the rupture disk holder assembly 42. The formed end plate 40 thus also serves as an attachment interface for the diffuser screen 46. A perspective view of an exemplary diffuser screen 46 is shown in FIG. 4.

Figure 5:
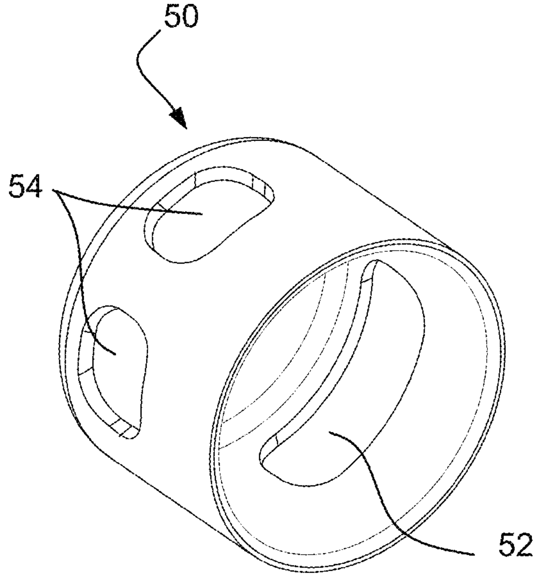
FIG. 5 shows an exemplary external diffuser.

A diffuser 50 is secured over the diffuser screen 46 and is secured via welding or the like to an end of the housing 12. The diffuser 50 includes exit openings of suitable sizes and shapes. The products of combustion flow through the exit openings into the airbag. A perspective view of an exemplary diffuser 50 is shown in FIG. 5. The exemplary diffuser 50 includes one large oblong opening 52 and two smaller oblong openings 54. Other configurations may be suitable for a specific application.

The initiator 14 actuates the ignition train by deploying directly into the generant booster 22. The booster propellant, in turn, ignites the propellant chamber, and the internal combustion of the propellant and stored gas mixture within the pressure vessel begins to increase the internal pressure.

As the generant burns and mixes with the stored gas, products of combustion pass through a series of mediums and channels that serve as collection areas for larger particles created through the combustion process. As noted, the spring 34 may include a closed top portion such that the spring not only loads the propellant bed, but also provides a surface to block larger particles.

Figure 6:
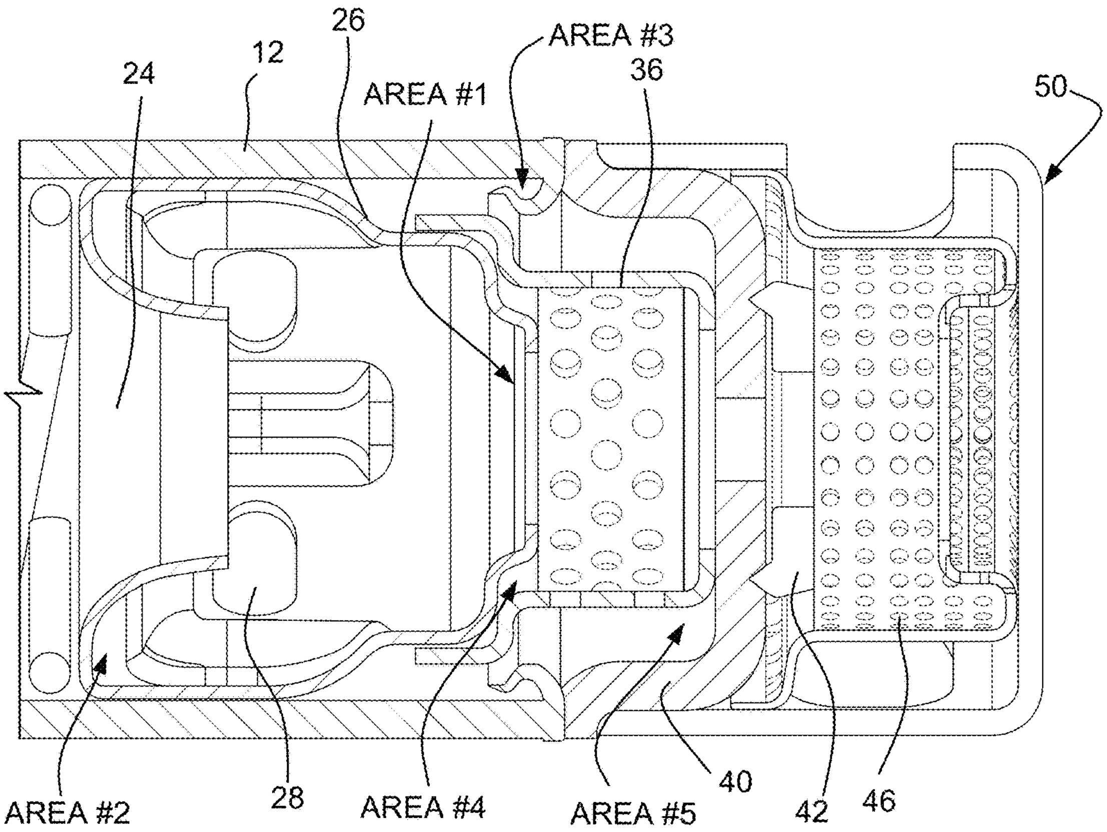
FIG. 6 is a close-up view of the exhaust end of the pressure vessel showing debris collection areas.

With reference to FIG. 6, the products of combustion flow through the internal nozzle 24, which directs the flow into the debris canister 26 where particles can collect in Area #1. The flow is redirected by the debris canister 26 toward the radial orifices 28 along the side wall of the debris canister 26. A second particle collection point labeled Area #2 is located at the corner of the debris canister 26 as the flow takes its secondary turn out of the radial orifices 28. The flow is then directed toward the top of the debris canister 26 (to the right in FIG. 6), and another collection area labeled Area #3 is located at the internal friction weld/flash location between the housing 12 and the diffuser 50. As the flow continues into the screen canister 36 via apertures 38, debris is also collected at the press/interference fit between the debris canister 26 and the screen canister 36 (Area #4). Debris further accumulates at the press interference between the screen canister 36 and the formed end plate 40 (Area #5). The flow turns into the screen canister 36 via apertures 38, through the formed end plate 40, and through the rupture disk holder assembly 42 into the diffuser region. The flow exits the diffuser ports through the diffuser screen 46 and the exit openings of the diffuser 50. Additional particles and larger debris are captured in the diffuser screen 46 before the output is vented into the airbag.

The inflator 10 uses a single pressure vessel that retains all internal components and is welded at either end to hermetically seal stored gas in the housing/pressure vessel 12. The pressure vessel structural weld provides a mating surface for structural welds (laser or friction welding options) to create the overall inflator housing. In some embodiments, a low strength pressure vessel can be used for lower output designs, while a high strength pressure vessel can be used for higher output designs.

The initiator 14 uses an igniter housing to retain the initiator that is used to start the deployment process. The igniter housing has options for the design layout and welding operation. For example, the assemblies can be laser or friction welded for the structural requirements needed. Exemplary designs include a friction welded design, a laser welded design, an all-metal housing (laser or friction weld capable), or a molded connector interface housing (also laser or friction weld capable).

Figure 7:
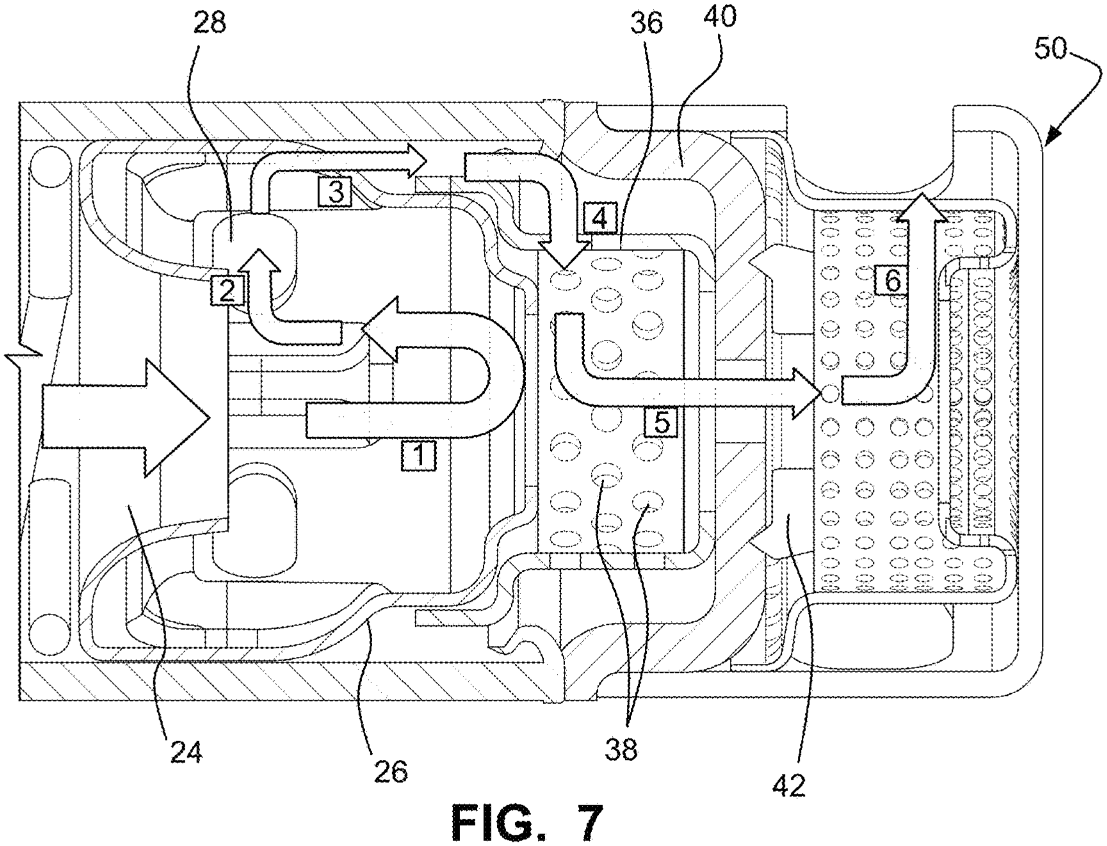
FIG. 7 is a close-up view of the exhaust end of the pressure vessel showing the tortuous path for the products of combustion.

FIG. 7 shows the tortuous path for the combustion flow after actuation of the initiator 14. Energy from the initiator 14 causes the booster generant 22 to ignite, and combustion starts inside the chamber and begins to flow through the spring 34. The internal nozzle 24 directs products of combustion into the debris accumulator canister 26. As flow contacts the closed top or basin of the DA canister 26, the flow turns 180 degrees toward the radial orifices 28 of the DA canister 26 (turn #1). The flow turns 90 degrees through the radial orifices 28 (turn #2) and turns 90 degrees outside of the DA canister 26 into the annular passageway 30 between the outside diameter of the DA canister 26 and the inside wall of the cylinder housing 12 (turn #3). The flow contacts the friction weld area and turns 90 degrees through the apertures 38 in the screen canister 36 (turn #4). The flow then turns 90 degrees toward the exit orifice in the screen canister 36 (turn #5), through the formed end plate 40, and through the rupture disk holder assembly 42. The flow turns 90 degrees through the diffuser screen 46 (turn #6) and is then expelled into the airbag.

Figure 8:
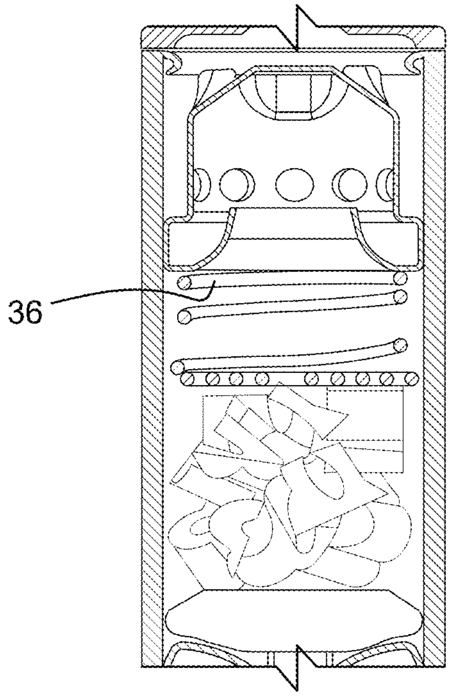
FIGS. 8-11 show variations of the internal components.
Figure 9:
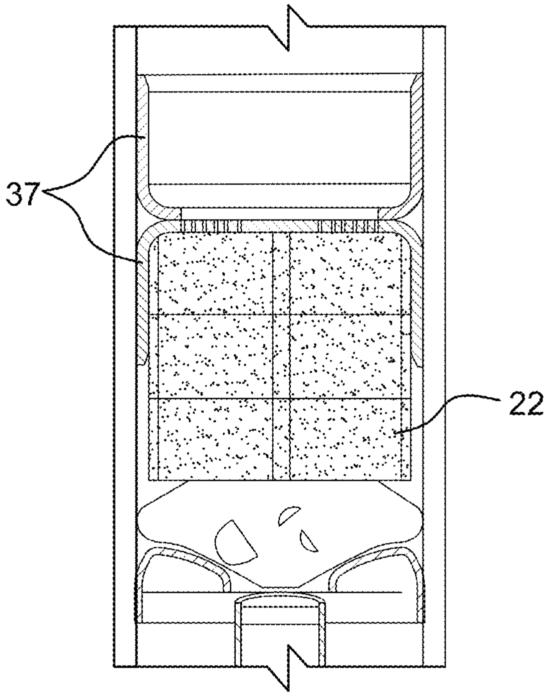
Figure 10:
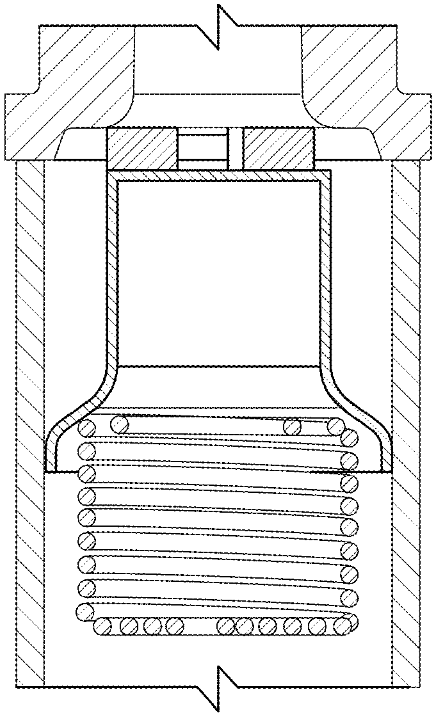
Figure 11:
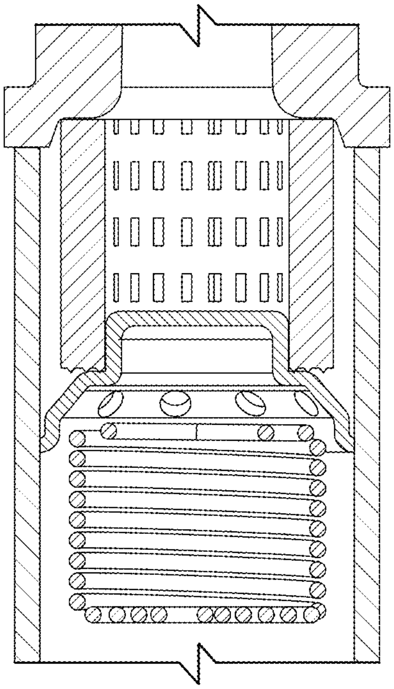

Additional or alternative components may be used to secure the generant in the propellant bed such as a formed cup with a filter top or the like. Examples are shown in FIGS. 8-11. FIG. 8 shows the baseline design with the coil spring 34 and a screen. FIG. 9 shows a dual cup design with cups 37 securing the generant 22. FIG. 10 shows a debris accumulator with spring design, and FIG. 11 shows a filter, diverter and spring design.

Figure 12:
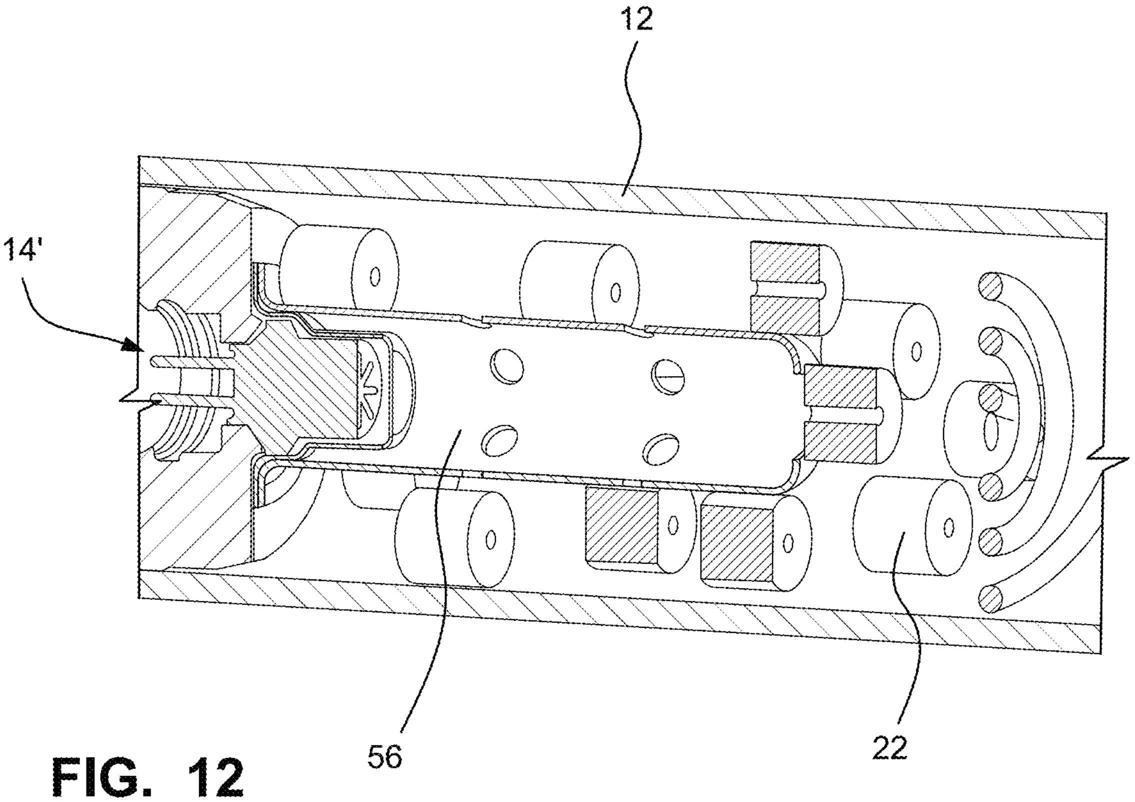
FIG. 12 shows an exemplary alternative booster propellant retention option with a booster tube design.
Figure 13:
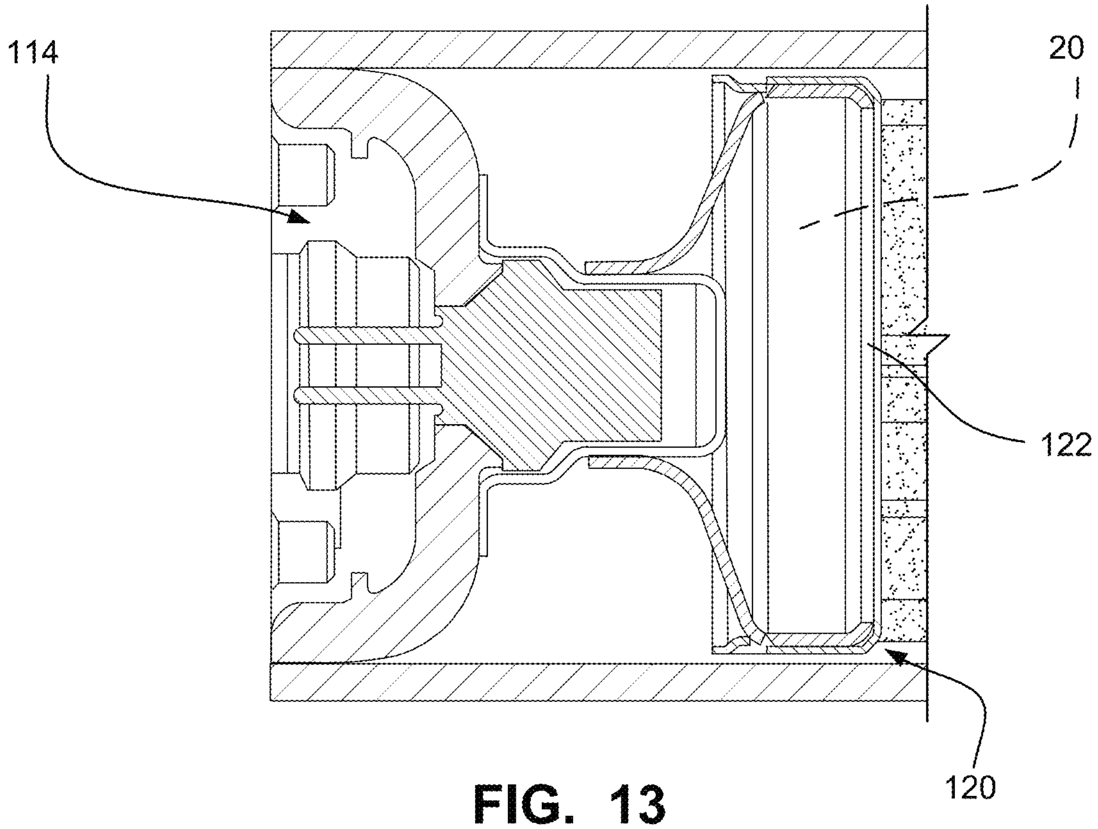
FIG. 13 shows a variation with a modified initiator assembly and an exemplary alternative booster propellant retention option with a canister and lid to house the booster assembly.

The booster propellant retention options can be implemented to achieve the desired performance output as well as meeting safety, structural and industry requirements. FIG. 1 shows a baseline assembly with the cover disk 16 and the booster pouch 20. In one alternative, a booster housing could be implemented without the booster pouch. FIG. 12 shows another alternative initiator 14' including a booster tube 56. FIG. 13 shows a variation with a modified initiator assembly 114 and booster pouch 20. The initiator assembly 114 may include an igniter body in the form of an all metal part or as shown, a half metal and half molded part. The booster pouch may be modified to be a booster assembly 120 to protect the propellant baggie (teabag material). As shown, the booster assembly 120 may include a canister 122 with a lid to protect the booster pouch 20 from tearing/ripping.

The inflator assembly of the described embodiments uses a single combustion chamber comprised of an initiator, booster propellant, internal components pressed to a hard stop, and loose filled generant grains that create the emission system. Structural welds provide the robustness required for safety and hermeticity requirements. An external rupture disk assembly provides a hermetic seal, and flow is dispersed outside of the main inflator body external diffuser/spring components.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An airbag inflator assembly comprising:

a cylindrical housing;

an initiator assembly secured in an upstream end of the cylindrical housing;

a generant disposed in the cylindrical housing adjacent the initiator assembly;

an internal nozzle through which products of combustion flow, the internal nozzle engaging an inside wall of the cylindrical housing;

a debris canister disposed in the cylindrical housing downstream of the internal nozzle, wherein the internal nozzle is configured to direct the products of combustion into the debris canister, the debris canister including radial orifices adjacent an upstream end, wherein an outside diameter of the debris canister is spaced from the inside wall of the cylindrical housing thereby defining an annular passageway;

a screen canister positioned over the debris canister including a plurality of apertures;

a formed end plate secured over the screen canister and including an exit aperture;

a rupture disk assembly secured to the formed end plate over the exit aperture; and a diffuser region downstream of the rupture disk assembly including an output opening through which the products of combustion are vented into an airbag.

2. An airbag inflator according to claim 1, further comprising a spring secured between the internal nozzle and the generant.

3. An airbag inflator according to claim 2, wherein the spring is a coil spring comprising a closed top spring.

4. An airbag inflator according to claim 1, comprising a plurality of debris collection areas including a downstream end of the debris canister, an upstream end of the debris canister, an interface between the cylindrical housing and the formed end plate, an interface between the screen canister and the debris canister, and a downstream end of the screen canister.

5. An airbag inflator according to claim 1, wherein the screen canister is press fit to an exterior of the debris canister.

6. An airbag inflator according to claim 1, wherein the apertures in the screen canister define a staggered or offset hole pattern.

7. An airbag inflator according to claim 1, wherein the rupture disk assembly includes a rupture disk that is configured to rupture by products of combustion after actuation of the initiator assembly.

8. An airbag inflator according to claim 1, wherein the diffuser region comprises a diffuser screen and output openings for venting the products of combustion into the airbag.

9. An airbag inflator according to claim 1, wherein the cylindrical housing comprises an outside diameter of 35 mm or less.

10. An airbag inflator assembly comprising:

a cylindrical housing;

an initiator assembly secured in an upstream end of the cylindrical housing;

a generant disposed in the cylindrical housing adjacent the initiator assembly;

internal components that define a tortuous path for products of combustion and define a plurality of debris collection areas, the internal components including an internal nozzle through which products of combustion flow, a debris canister disposed in the cylindrical housing downstream of the internal nozzle, and an exit aperture, wherein the internal nozzle includes a tapered portion with a diameter that decreases in a downstream direction toward the debris canister to direct the products of combustion into the debris canister, wherein a downstream end of the debris canister is closed, and wherein the internal nozzle and the debris canister define one of the debris collection areas adjacent an upstream end of the debris canister;

a rupture disk assembly secured over the exit aperture; and a diffuser region downstream of the rupture disk assembly including an output opening through which the products of combustion are vented into an airbag.

11. An airbag inflator assembly according to claim 10, wherein the tortuous path comprises at least four turns between the generant and the exit aperture.

12. An airbag inflator assembly according to claim 11, wherein the tortuous path comprises six turns between the generant and the exit aperture.

13. An airbag inflator assembly according to claim 10, further comprising at least two debris collection areas among the internal components.

14. An airbag inflator assembly according to claim 10, wherein the cylindrical housing comprises an outside diameter of 35 mm or less.

15. An airbag inflator assembly according to claim 10, wherein the internal nozzle engages an inside wall of the cylindrical housing, and wherein the debris canister includes radial orifices adjacent an upstream end, the internal components further comprising:

a screen canister positioned over the debris canister including a plurality of apertures; and a formed end plate secured over the screen canister and including the exit aperture, wherein the rupture disk assembly is secured to the formed end plate over the exit aperture.

16. An airbag inflator assembly comprising:

a cylindrical housing;

an initiator assembly secured in an upstream end of the cylindrical housing;

a generant disposed in the cylindrical housing adjacent the initiator assembly;

internal components that define a tortuous path for products of combustion and define five debris collection areas, the internal components including an exit aperture;

a rupture disk assembly secured over the exit aperture; and a diffuser region downstream of the rupture disk assembly including an output opening through which the products of combustion are vented into the airbag.

* * * * *